(12) United States Patent
Muto et al.

(10) Patent No.: US 10,642,117 B2
(45) Date of Patent: May 5, 2020

(54) LIQUID CRYSTAL DISPLAY DEVICE AND METHOD OF PRODUCING LIQUID CRYSTAL DISPLAY DEVICE

(71) Applicant: SHARP KABUSHIKI KAISHA, Sakai, Osaka (JP)

(72) Inventors: Yuta Muto, Sakai (JP); Kohshiroh Taniike, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/364,645

(22) Filed: Mar. 26, 2019

(65) Prior Publication Data

US 2019/0302552 A1    Oct. 3, 2019

Related U.S. Application Data

(60) Provisional application No. 62/649,709, filed on Mar. 29, 2018.

(51) Int. Cl.

| G02F 1/1362 | (2006.01) |
|---|---|
| G02F 1/1368 | (2006.01) |
| G02F 1/1337 | (2006.01) |
| G02F 1/1333 | (2006.01) |
| G02F 1/1343 | (2006.01) |

(52) U.S. Cl.
CPC ...... *G02F 1/136227* (2013.01); *G02F 1/1368* (2013.01); *G02F 1/133345* (2013.01); *G02F 1/133711* (2013.01); *G02F 1/134363* (2013.01); *G02F 2001/133738* (2013.01)

(58) Field of Classification Search
None
See application file for complete search history.

(56) References Cited

U.S. PATENT DOCUMENTS

| 2002/0067322 A1* | 6/2002 | Yanagawa | G02F 1/134363 345/87 |
|---|---|---|---|
| 2012/0008081 A1* | 1/2012 | Tsai | G02F 1/134363 349/139 |

(Continued)

FOREIGN PATENT DOCUMENTS

| CN | 205248273 U | 5/2016 |
|---|---|---|
| JP | 2015-087600 A | 5/2015 |

(Continued)

*Primary Examiner* — Ryan Crockett
(74) *Attorney, Agent, or Firm* — ScienBiziP, P.C.

(57) ABSTRACT

The liquid crystal display device according to the present invention includes: a thin-film transistor substrate, wherein the thin-film transistor substrate includes an organic insulating film disposed on a drain electrode and provided with a contact hole, the contact hole includes first, second, third, and fourth side wall portions in the given order, an inclination of an upper portion of the second side wall portion is gentler than an inclination of an upper portion of each of the first and third side wall portions, and the contact hole satisfies W2>L, wherein L is a distance from an upper end of the first side wall portion to an upper end of the third side wall portion on a first straight line, and W2 is a maximum distance between one and another upper end of the second side wall portion on a third straight line parallel to the first straight line.

15 Claims, 8 Drawing Sheets

(56) References Cited

U.S. PATENT DOCUMENTS

| | | | |
|---|---|---|---|
| 2015/0116623 A1* | 4/2015 | Tomioka | G02F 1/136227 349/43 |
| 2015/0138476 A1* | 5/2015 | Hyodo | G02F 1/136227 349/43 |
| 2015/0160521 A1* | 6/2015 | Tomioka | G02F 1/133707 349/110 |
| 2015/0355516 A1 | 12/2015 | Sharp | |
| 2016/0048045 A1* | 2/2016 | Imai | G02F 1/1337 349/123 |
| 2016/0109771 A1 | 4/2016 | Tomioka et al. | |
| 2016/0327843 A1 | 11/2016 | Tomioka et al. | |
| 2017/0075179 A1 | 3/2017 | Tomioka et al. | |
| 2017/0146872 A1 | 5/2017 | Tomioka et al. | |
| 2017/0363920 A1 | 12/2017 | Tomioka et al. | |
| 2018/0046047 A1 | 2/2018 | Tomioka et al. | |
| 2018/0164648 A1 | 6/2018 | Tomioka et al. | |
| 2018/0180957 A1 | 6/2018 | Tomioka et al. | |
| 2018/0292722 A1 | 10/2018 | Tomioka et al. | |
| 2018/0299735 A1 | 10/2018 | Tomioka et al. | |
| 2018/0356693 A1* | 12/2018 | Itou | G02F 1/134309 |
| 2019/0064619 A1* | 2/2019 | Tomioka | G02F 1/133707 |

FOREIGN PATENT DOCUMENTS

| | | |
|---|---|---|
| JP | 2015-087652 A | 5/2015 |
| JP | 2015-099201 A | 5/2015 |
| JP | 2015-114374 A | 6/2015 |
| WO | 2014/103915 A1 | 7/2014 |

\* cited by examiner

LIQUID CRYSTAL DISPLAY DEVICE AND METHOD OF PRODUCING LIQUID CRYSTAL DISPLAY DEVICE

CROSS-REFERENCE TO RELATED APPLICATIONS

The present application claims priority under 35 U.S.C. § 119 to U.S. Provisional Application No. 62/649,709 filed on Mar. 29, 2018, the contents of which are incorporated herein by reference in their entirety.

BACKGROUND OF THE INVENTION

Field of the Invention

The present invention relates to a liquid crystal display device and a method of producing a liquid crystal display device. The present invention particularly relates to a liquid crystal display device having an organic insulating film provided with a contact hole, and a method of producing a liquid crystal display device.

Description of Related Art

The liquid crystal display device has a configuration in which a liquid crystal layer is disposed between a thin-film transistor substrate having a thin-film transistor (TFT) and a color filter substrate having a color filter. A pixel electrode is disposed on the thin-film transistor substrate, and in order to electrically connect a drain electrode constituting the TFT and the pixel electrode, a contact hole is formed in an insulating film disposed between the pixel electrode and the drain electrode. Alignment films are provided between the thin-film transistor substrate and the liquid crystal layer and between the color filter substrate and the liquid crystal layer, and alignment of liquid crystal molecules in the liquid crystal layer is controlled.

As a technique for forming an alignment film on a substrate provided with a contact hole, for example, in JP 2015-87652 A, a method in which the substrate is moved in a column direction where a data line extends with respect to a head provided with an ink jet nozzle is disclosed as a method that solves a problem that, due to a phenomenon that an alignment film material added dropwise from an ink jet nozzle flows into the contact hole formed on the substrate, a region where the alignment film is not suitably formed is formed to cause display unevenness. In JP 2015-87652 A, display unevenness is improved by defining an application direction of an ink jet device.

Further, JP 2015-99201 A, JP 2015-87600 A, and JP 2015-114374 A disclose a method of addressing a phenomenon that, when a diameter of a through hole (contact hole) used for connecting a pixel electrode and a source electrode decreases, an alignment film material hardly flows into the through hole. JP 2015-99201 A discloses a liquid crystal display device in which a through hole which connects a pixel electrode and a source electrode of a TFT has a large opening on the liquid crystal side, a small opening on the TFT substrate side, and an inner wall connecting the large opening and the small opening. The pixel electrode covers the through hole on an inner side of the pixel of the through hole but does not cover a periphery of the large opening of the through hole on an outer side of the through hole. JP 2015-87600 A discloses a liquid crystal display device in which a taper angle on a side near an upper base of a through hole is smaller than a taper angle on a side near a lower base. JP 2015-114374 A discloses a liquid crystal display device in which a taper angle at a depth of D/2 of a through hole is equal to or more than 50 degrees. A pixel electrode covers part of a side wall of the through hole but does not cover the remaining part of the side wall of the through hole.

BRIEF SUMMARY OF THE INVENTION

Various members are complicatedly provided on a thin-film transistor substrate and a color filter substrate of a liquid crystal display device, and there are irregularities on the surface thereof. Therefore, when an alignment film material is applied to the substrate in order to form an alignment film, it may be difficult to uniformly apply the alignment film material over the entire surface of the substrate. For example, in some portions, the alignment film material flows into recesses, but in other portions, the alignment film material does not flow into recesses, so that the alignment film material forms a liquid pool. Thus, film thickness unevenness (application unevenness) may occur in the alignment film. In particular, the inflow of the alignment film material into a contact hole is not stabilized, and the thickness unevenness of the alignment film may be greatly affected in some cases.

The methods of applying the alignment film material are roughly classified into two methods. The first method is a roll coater method using a flexographic plate, and the second method is an ink jet method using a nozzle shot. Compared with the roll coater method, the ink jet method has advantages that positional accuracy with which the alignment film material is applied is high and an ink consumption amount is small, and is an application method suitable for achievement of high definition and frame narrowing. However, compared with the roll coater method, application unevenness tends to occur in the ink jet method.

In the application by the ink jet method, it is ideal to discharge the alignment film material continuously from a nozzle at regular intervals and to uniformly spread out the droplets so as to create a film surface having a uniform film thickness. However, a pitch between the nozzles of the ink jet is generally larger than a pitch of concavities and convexities of a base material. A difference occurs in the inflow of the alignment film material into the concave-convex shape, which causes the thickness unevenness of the alignment film. In particular, the inflow of the alignment film material into the contact hole is not stabilized, which is a dominant factor of the film thickness unevenness. An excessive alignment film material accumulates around the contact hole into which the alignment film material has not flowed, and the film thickness of the alignment film material becomes partially thick, as a result of which the film thickness unevenness may occur. When this film thickness unevenness occurs beyond a light shielding region of a black matrix, the film thickness unevenness is visually recognized as display unevenness.

In JP 2015-87652 A, the phenomenon that the alignment film material flows into the contact hole formed on the substrate is suppressed, and the overall thickness unevenness of the alignment film is improved. However, there is still room for improvement in order to improve film thickness unevenness occurring at the contact hole and around its periphery. In JP 2015-99201 A, a gentle taper is provided on one side of the contact hole so that the alignment film material easily flows into the contact hole through the gentle taper. However, as the distance from the center of the contact hole increases, the width of the gentle taper decreases, and an opening of the contact hole is narrow when the alignment film material flows into the contact hole. Thus, there is still room for improvement in order to facilitate the inflow of the alignment film material into the contact hole and suppress the thickness unevenness of the alignment film. In JP 2015-87600 A and JP 2015-114374 A, a gentle taper is provided around the entire circumference of the contact hole. Thus, in a high definition liquid crystal display device, there is a possibility that a designed contact hole cannot be formed due to interference between contact holes of adjacent pixels.

The present invention has been made in view of such a current state of the art and aims to provide a liquid crystal display device in which the size of a contact hole is kept small and thickness unevenness of an alignment film is suppressed, and a method of producing a liquid crystal display device.

The present inventors have made various studies on a liquid crystal display device in which the size of a contact hole is kept small and thickness unevenness of an alignment film is suppressed, and a method of producing a liquid crystal display device, and have paid attention to the shape of a contact hole to be provided in an organic insulating film. The present inventors have found the following: a side wall surrounding a bottom portion of the contact hole provided in the organic insulating film has a first side wall portion, a second side wall portion, a third side wall portion and a fourth side wall portion in the given order in a circumferential direction of the contact hole; in a plan view, while the first side wall portion, the bottom portion and the third side wall portion are arranged in the given order on a first straight line, the second side wall portion, the bottom portion and the fourth side wall portion are arranged in the given order on a second straight line orthogonal to the first straight line; and an inclination of an upper portion of the second side wall portion is gentler than an inclination of an upper portion of each of the first side wall portion and the third side wall portion, whereby an alignment film material easily flows into the contact hole from the second side wall portion having a relatively gentle inclination at its upper portion, and in addition, the size of the contact hole can be further reduced as compared with a case where an inclination of the entire side wall surrounding the bottom portion of the contact hole is gentle. The present inventors have further found that the contact hole provided in the organic insulating film satisfies W2>L, wherein L is a distance from an upper end of the first side wall portion on the first straight line to an upper end of the third side wall portion, and W2 is a maximum distance between one upper end and the other upper end of the second side wall portion on a third straight line parallel to the first straight line, an opening through which the alignment film material passes when flowing into the contact hole from the second side wall portion can be increased, and the alignment film material can more easily flow into the contact hole. Thereby, the inventors have arrived at the solution to the above problem, completing the present invention.

That is, one aspect of the present invention may be a liquid crystal display device including: a thin-film transistor substrate; a counter substrate facing the thin-film transistor substrate; and a liquid crystal layer held between the thin-film transistor substrate and the counter substrate, wherein the thin-film transistor substrate includes a thin-film transistor including a drain electrode, an organic insulating film disposed on the drain electrode, and a pixel electrode disposed on the organic insulating film, the pixel electrode is connected to the drain electrode through a contact hole provided in the organic insulating film, the contact hole provided in the organic insulating film includes a bottom portion and a side wall surrounding the bottom portion, the side wall includes a first side wall portion, a second side wall portion, a third side wall portion, and a fourth side wall portion in the given order in a circumferential direction of the contact hole, in a plan view, while the first side wall portion, the bottom portion, and the third side wall portion are arranged in the given order on a first straight line, the second side wall portion, the bottom portion, and the fourth side wall portion are arranged in the given order on a second straight line orthogonal to the first straight line, an inclination of an upper portion of the second side wall portion is gentler than an inclination of an upper portion of each of the first side wall portion and the third side wall portion, and the contact hole provided in the organic insulating film satisfies W2>L, wherein L is a distance from an upper end of the first side wall portion to an upper end of the third side wall portion on the first straight line, and W2 is a maximum distance between one upper end and another upper end of the second side wall portion on a third straight line parallel to the first straight line.

An inclination angle of the upper portion of each of the first side wall portion and the third side wall portion may be more than 20°, and an inclination angle of the upper portion of the second side wall portion may be 10° or more and 20° or less.

The inclination of the upper portion of the second side wall portion may be gentler than the inclination of the upper portion of the fourth side wall portion.

An inclination angle of the upper portion of the fourth side wall portion may be more than 20°.

The inclination of the upper portion of the fourth side wall portion may be gentler than the inclination of the upper portion of each of the first side wall portion and the third side wall portion, and the contact hole provided in the organic insulating film may satisfy W4>L, wherein W4 is a maximum distance between one upper end and the other upper end of the fourth side wall portion on a fourth straight line parallel to the first straight line.

The inclination angle of the upper portion of the fourth side wall portion may be 10° or more and 20° or less.

That is, another aspect of the present invention may be a method of producing a liquid crystal display device including a thin-film transistor substrate, a counter substrate facing the thin-film transistor substrate, and a liquid crystal layer held between the thin-film transistor substrate and the counter substrate, wherein the thin-film transistor substrate includes a thin-film transistor including a drain electrode, an organic insulating film disposed on the drain electrode, and a pixel electrode disposed on the organic insulating film, the pixel electrode is connected to the drain electrode through a contact hole provided in the organic insulating film, the contact hole provided in the organic insulating film includes a bottom portion and a side wall surrounding the bottom portion, the side wall includes a first side wall portion, a second side wall portion, a third side wall portion, and a fourth side wall portion in the given order in a circumferential direction of the contact hole, in a plan view, while the first side wall portion, the bottom portion, and the third side wall portion are arranged in the given order on a first straight line, the second side wall portion, the bottom portion, and the fourth side wall portion are arranged in the given order on a second straight line orthogonal to the first straight line, an inclination of an upper portion of the second side wall portion is gentler than an inclination of an upper portion of each of the first side wall portion and the third side wall portion, and the contact hole provided in the organic insulating film satisfies W2>L, wherein L is a distance from an upper end of the first side wall portion to an upper end of the third side wall portion on the first straight line, and W2 is a maximum distance between one upper end and another upper end of the second side wall portion on a third straight line parallel to the first straight line. This production method may include applying an alignment film material onto the thin-film transistor substrate.

The inclination angle of the upper portion of each of the first side wall portion and the third side wall portion may be more than 20°, and the inclination angle of the upper portion of the second side wall portion may be 10° or more and 20° or less.

The applying an alignment film material may include adding dropwise the alignment film material onto the thin-film transistor substrate by an ink jet method.

The applying an alignment film material may include adding dropwise the alignment film material sequentially in a predetermined direction parallel to the second straight line.

The inclination of the upper portion of the second side wall portion may be gentler than the inclination of the upper portion of the fourth side wall portion, and the applying an alignment film material may include adding dropwise the alignment film material sequentially from a second side wall portion side toward a fourth side wall portion side.

The inclination of the upper portion of the second side wall portion may be gentler than the inclination of the upper portion of the fourth side wall portion, and the applying an alignment film material may include adding dropwise the alignment film material sequentially from the fourth side wall portion side toward the second side wall portion side.

An inclination angle of the upper portion of the fourth side wall portion may be more than 20°.

The inclination of the upper portion of the fourth side wall portion may be gentler than the inclination of the upper portion of each of the first side wall portion and the third side wall portion, and the contact hole provided in the organic insulating film may satisfy W4>L, wherein W4 is a maximum distance between one upper end and the other upper end of the fourth side wall portion on a fourth straight line parallel to the first straight line.

The inclination angle of the upper portion of the fourth side wall portion may be 10° or more and 20° or less.

The present invention can provide a liquid crystal display device in which the size of a contact hole is kept small and thickness unevenness of an alignment film is suppressed, and a method of producing a liquid crystal display device.

DETAILED DESCRIPTION OF THE INVENTION

Figure 1:
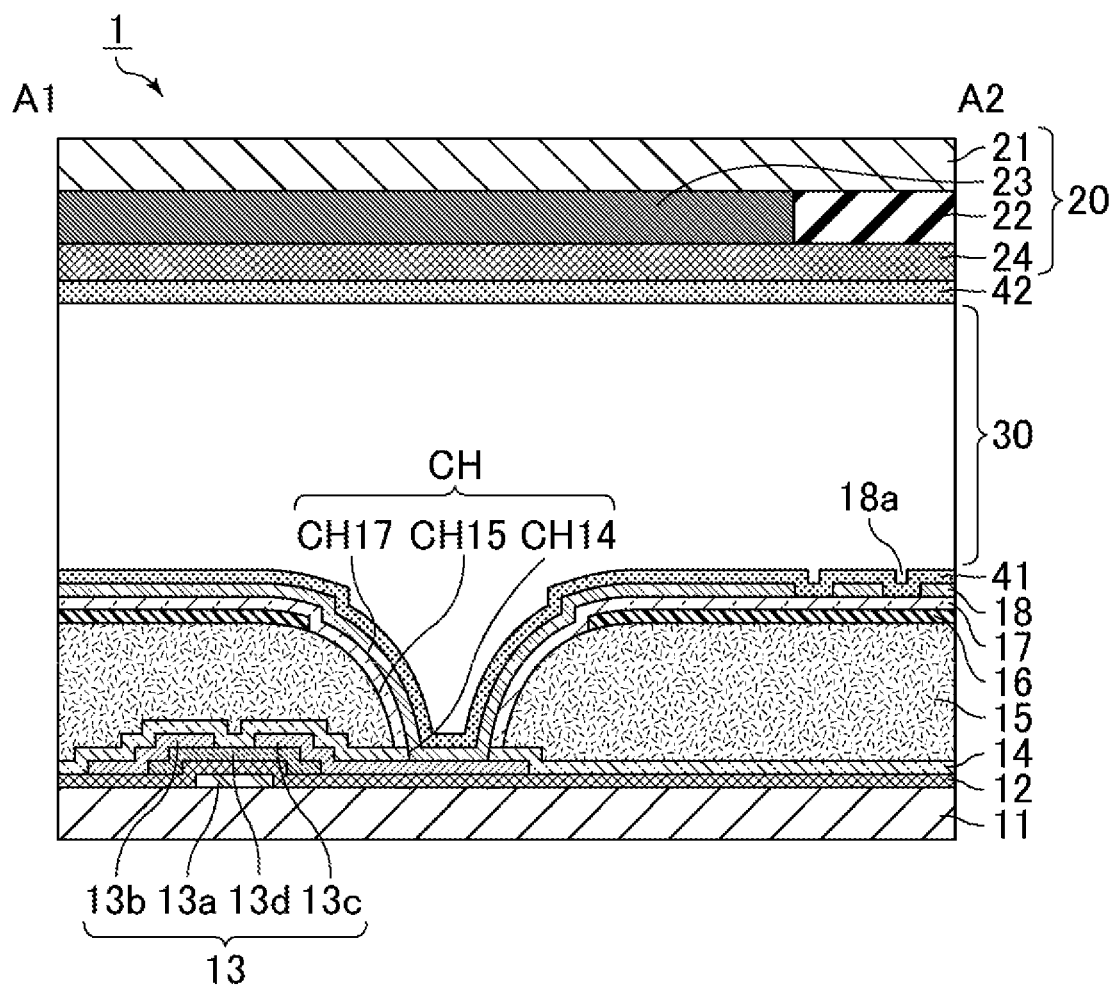
FIG. 1 is a schematic cross-sectional view of a liquid crystal display device of Embodiment 1.

Hereinafter, embodiments of the present invention will be described. The following embodiments, however, are not intended to limit the scope of the present invention. The present invention may appropriately be modified within the scope of the configuration of the present invention. The same components or components having the same or similar functions are commonly provided with the same reference signs in the drawings, and description of such components is omitted. The configurations described in the embodiments may appropriately be combined or modified within the spirit of the present invention.

Embodiment 1

Figure 2:
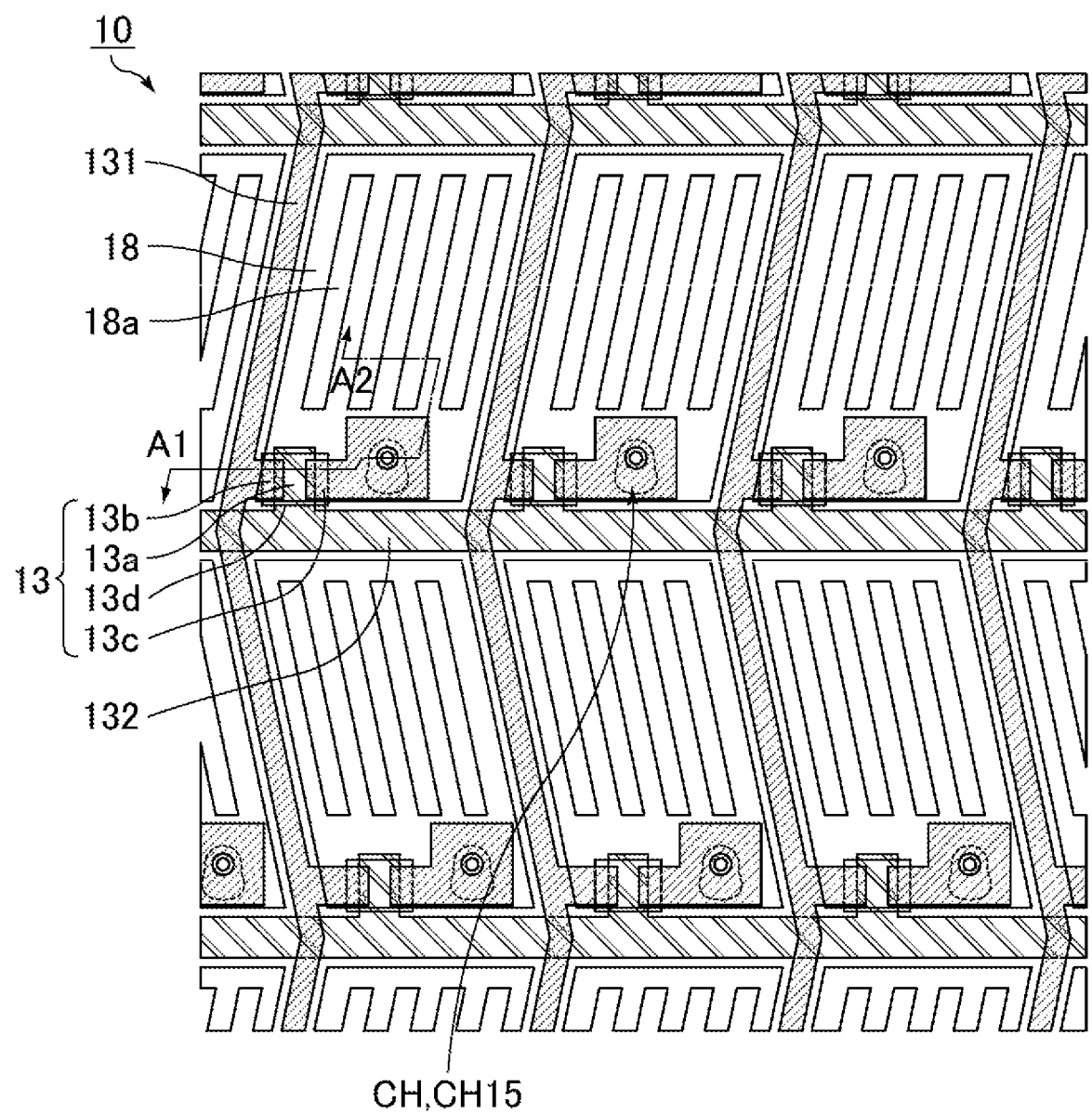
FIG. 2 is a schematic plan view of a thin-film transistor substrate included in the liquid crystal display device of Embodiment 1.

In this embodiment, an explanation will be given by taking an FFS mode liquid crystal display device as an example. FIG. 1 is a schematic cross-sectional view of the liquid crystal display device of Embodiment 1. FIG. 2 is a schematic plan view of a thin-film transistor substrate included in the liquid crystal display device of Embodiment 1. FIG. 1 is a schematic cross-sectional view taken along a line A1-A2 in FIG. 2. As shown in FIG. 1, a liquid crystal display device 1 of the present embodiment includes a thin-film transistor substrate 10, a counter substrate 20 facing the thin-film transistor substrate 10, and a liquid crystal layer 30 provided between the thin-film transistor substrate 10 and the counter substrate 20.

The thin-film transistor substrate 10 has a structure in which an insulating substrate 11, a gate insulating film 12, an inorganic insulating film 14, an organic insulating film 15, a common electrode 16, an interlayer insulating film 17, and a pixel electrode 18 provided with a slit 18a are sequentially stacked toward the liquid crystal layer 30. Contact holes (openings) CH14, CH15, and CH17 are provided in the inorganic insulating film 14, the organic insulating film 15 and the interlayer insulating film 17, respectively, and a drain electrode 13c constituting a TFT 13 is electrically connected to the pixel electrode 18 through the contact holes CH14, CH15 and CH17. The positions of the centers of the contact holes CH14, CH15 and CH17 provided in the inorganic insulating film 14, the organic insulating film 15 and the interlayer insulating film 17 are substantially the same. The contact holes CH14, CH15 and CH17 formed in the inorganic insulating film 14, the organic insulating film 15 and the interlayer insulating film 17, respectively, are hereinafter collectively referred to as a contact hole CH.

As shown in FIG. 2, the thin-film transistor substrate 10 has multiple source lines (data lines) 131 and multiple gate lines (scanning lines) 132 that intersect with the source lines 131 and includes the TFTs 13 as switching elements. Each of the TFTs 13 is a three-terminal switch which is connected to a corresponding one of the source lines 131 and a corresponding one of the gate lines 132 and has a gate electrode 13a protruding from the corresponding gate line 132, a source electrode 13b protruding from the corresponding source line 131, a drain electrode 13c connected to a corresponding one of the pixel electrodes 18, and a thin-film semiconductor 13d. The source electrode 13b and the drain electrode 13c are electrodes provided in the same layer as the source line 131, and the gate electrode 13a is an electrode provided in the same layer as the gate line 132.

The counter substrate 20 is a color filter substrate and has a structure as shown in FIG. 1 in which an insulating substrate 21, a color filter 22, a black matrix 23, and an overcoat layer 24 are sequentially stacked toward the liquid crystal layer 30.

On the surface of the thin-film transistor substrate 10 on the liquid crystal layer 30 side, an alignment film (horizontal alignment film) 41 is provided. On the opposite side of the thin-film transistor substrate 10 from the liquid crystal layer 30, a first polarizing plate and a backlight are sequentially arranged from the thin-film transistor substrate 10 side. On the surface of the counter substrate 20 on the liquid crystal layer 30 side, an alignment film (horizontal alignment film) 42 is provided. On the opposite side of the counter substrate 20 from the liquid crystal layer 30, a second polarizing plate is disposed. The first polarizing plate and the second polarizing plate are both absorptive polarizers and disposed in a crossed Nicols with their absorption axes perpendicular to each other. Liquid crystal molecules in the liquid crystal layer 30 are homogeneously aligned in a direction parallel to an absorption axis of any one of the polarizing plates in a no-voltage applied state. As a result, the liquid crystal display device 1 of the present embodiment is in a normally black mode.

The liquid crystal display device 1 of the present embodiment further includes a source driver electrically connected to the source line 131, a gate driver electrically connected to the gate line 132, and a controller. The gate driver sequentially supplies a scanning signal to the gate line 132 under the control of the controller. The source driver supplies a data signal to the source line 131 under the control of the controller at a timing when the TFT 13 is brought into a voltage applied state by the scanning signal. The pixel electrodes 18 are each set to a potential according to the data signal supplied through the corresponding TFT 13, a fringe electric field is generated between the pixel electrode 18 and a common electrode 16, and the liquid crystal molecules of the liquid crystal layer 30 rotate. In this manner, the magnitude of a voltage applied between the pixel electrode 18 and the common electrode 16 is controlled, retardation of the liquid crystal layer 30 is changed, and transmission and non-transmission of light are controlled.

Details of the contact hole provided in the organic insulating film 15 will be described below.

Figure 3:
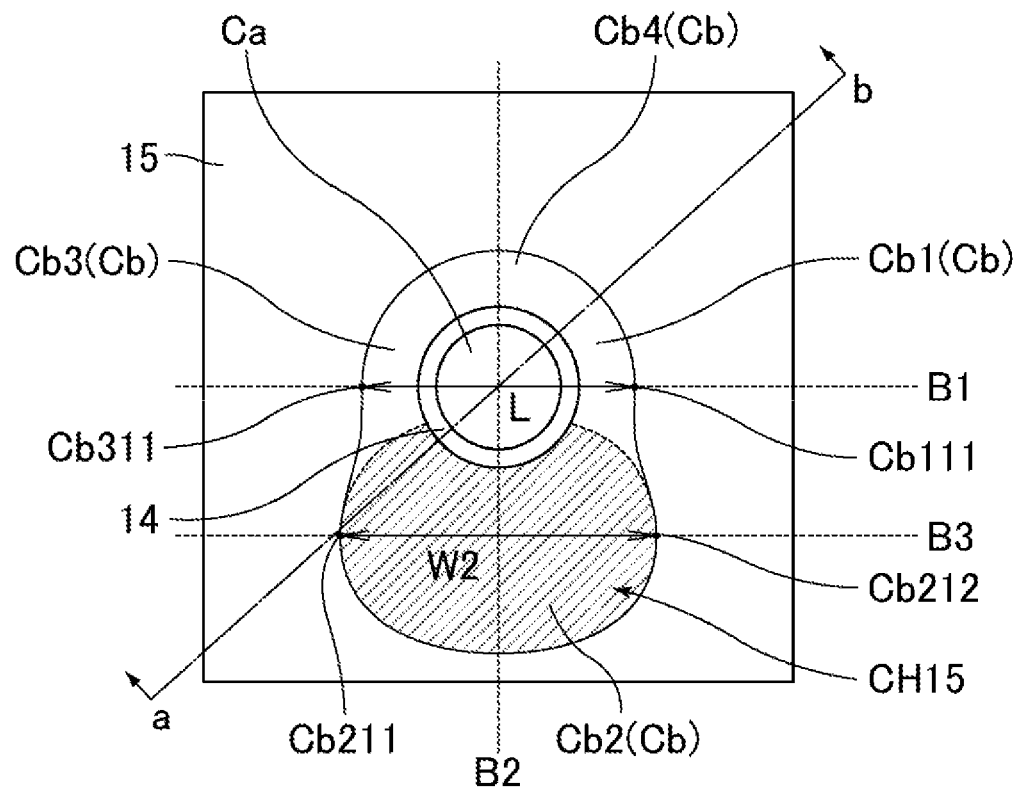
FIG. 3 is a schematic plan view of a contact hole portion provided in the thin-film transistor substrate included in the liquid crystal display device of Embodiment 1.
Figure 4:
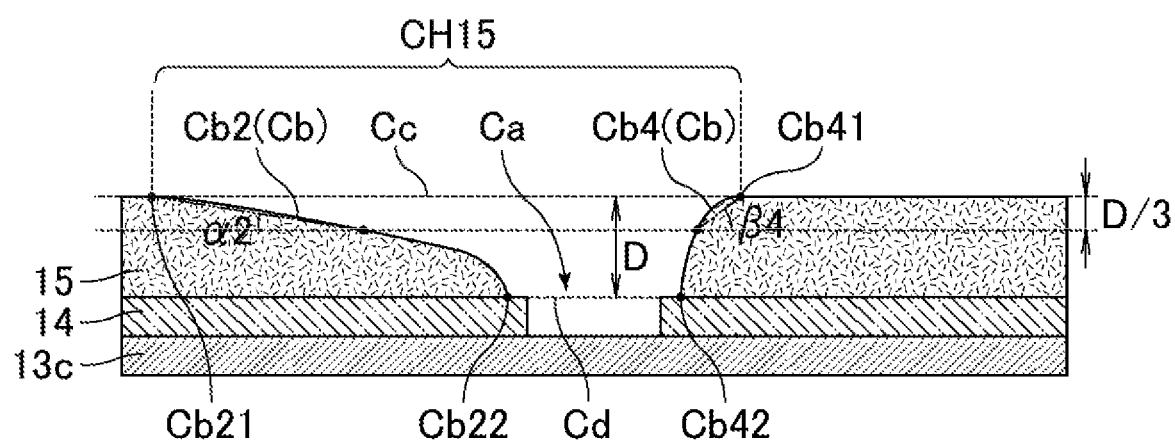
FIG. 4 is a schematic cross-sectional view of the contact hole portion provided in the thin-film transistor substrate included in the liquid crystal display device of Embodiment 1.
Figure 5:
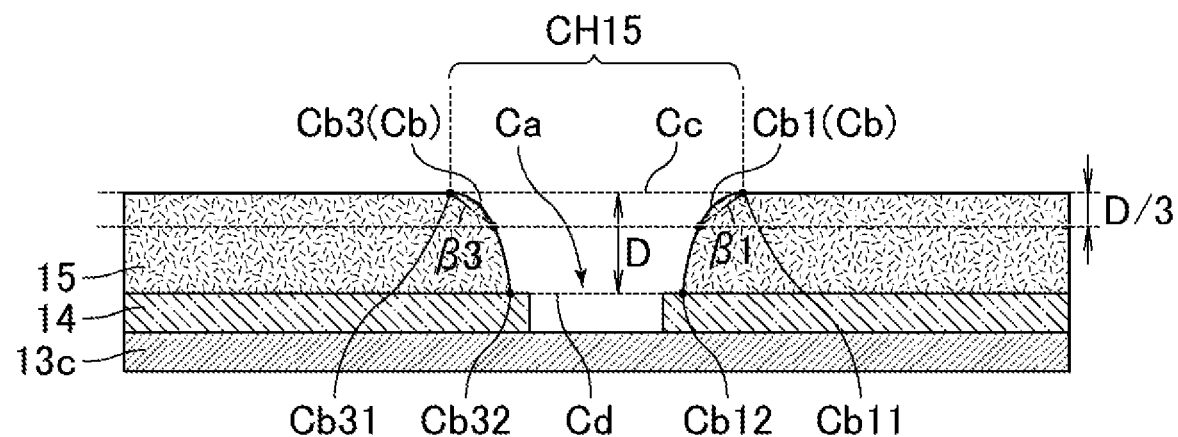
FIG. 5 is a schematic cross-sectional view of the contact hole portion provided in the thin-film transistor substrate included in the liquid crystal display device of Embodiment 1.
Figure 6:
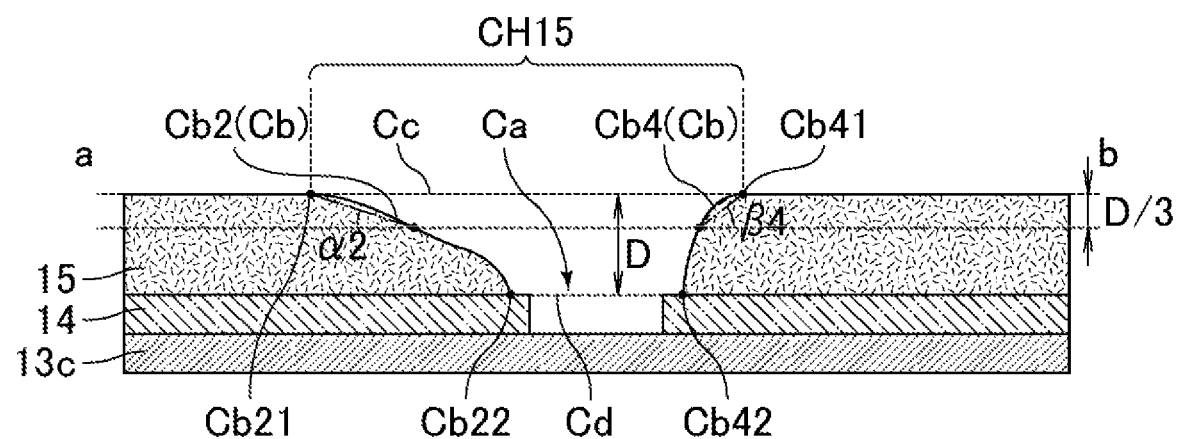
FIG. 6 is a schematic cross-sectional view of the contact hole portion provided in the thin-film transistor substrate included in the liquid crystal display device of Embodiment 1.

FIG. 3 is a schematic plan view of a contact hole portion provided in a thin-film transistor substrate included in the liquid crystal display device of Embodiment 1. FIGS. 4 to 6 are each a schematic cross-sectional view of the contact hole portion provided in the thin-film transistor substrate included in the liquid crystal display device of Embodiment 1. FIG. 4 is a schematic cross-sectional view taken along a second straight line B2 in FIG. 3. FIG. 5 is a schematic cross-sectional view taken along a first straight line B1 in FIG. 3. FIG. 6 is a schematic cross-sectional view taken along a line a-b in FIG. 3. FIG. 6 shows a cross section passing through one upper end Cb211 of a second side wall portion Cb2 on a third straight line B3 parallel to the first straight line B1 in FIG. 3. In FIGS. 3 to 6, the members provided above the organic insulating film 15 are omitted from the viewpoint of visibility.

As shown in FIGS. 3 to 6, the contact hole CH15 provided in the organic insulating film 15 has a bottom portion Ca and a side wall Cb surrounding the bottom portion Ca. The side wall Cb has a first side wall portion Cb1, a second side wall portion Cb2 (the diagonally hatched portion in FIG. 3), a third side wall portion Cb3 and a fourth side wall portion Cb4 in the given order in a circumferential direction of the contact hole CH15. In a plan view, while the first side wall portion Cb1, the bottom portion Ca and the third side wall portion Cb3 are arranged in the given order on the first straight line (imaginary line) B1, the second side wall portion Cb2, the bottom portion Ca and the fourth side wall portion Cb4 are arranged in the given order on the second straight line (imaginary line) B2 orthogonal to the first straight line B1. An inclination of an upper portion of the second side wall portion Cb2 is gentler than an inclination of an upper portion of each of the first and third side wall portions Cb1 and Cb3.

By adopting such an embodiment, when an alignment film material is applied onto the thin-film transistor substrate 10 to form an alignment film 41, the alignment film material easily flows into the contact hole CH15 from the second side wall portion Cb2 having at its upper portion a relatively gentle inclination and smaller surface tension, and it is possible to suppress application unevenness while suppressing a liquid pool of the alignment film material around the contact hole CH15 and to suppress thickness unevenness of the alignment film 41. In addition, the size of the contact hole CH15 can be further reduced as compared with a case where the inclination of the entire side wall Cb surrounding the bottom portion Ca of the contact hole CH15 is gentle. Therefore, even in a high definition liquid crystal display device, it is possible to suppress interference between contact holes of adjacent pixels and to form the contact hole CH15 as designed. Since it is difficult to control alignment of the liquid crystal molecules at a portion where the contact hole CH15 is provided, the portion is shielded by the black matrix. However, in the present embodiment, since the size of the contact hole CH15 can be further reduced, a high aperture ratio can be achieved by reducing a light shielding region due to the black matrix.

The contact hole CH15 provided in the organic insulating film 15 satisfies W2>L, wherein L is a distance from an upper end Cb111 of the first side wall portion Cb1 on the first straight line B1 to an upper end Cb311 of the third side wall portion Cb3, and W2 is a maximum distance between one upper end Cb211 and the other upper end Cb212 of the second side wall portion Cb2 on the third straight line B3 (imaginary line) parallel to the first straight line B1. By adopting such an embodiment, when the alignment film material is applied onto the thin-film transistor substrate 10 to form the alignment film 41, an opening through which the alignment film material passes when flowing into the contact hole CH15 from the second side wall portion Cb2 can be increased compared with a case where W2≤L, and the alignment film material more easily flows into the contact hole CH15 from the second side wall portion Cb2. As a result, a liquid pool of the alignment film material around the contact hole CH15 can be suppressed, application unevenness can be suppressed when the alignment film 41 is formed on the thin-film transistor substrate 10 can be suppressed, and the thickness unevenness of the alignment film 41 can be suppressed.

As described above, in the liquid crystal display device 1 of the present embodiment, the size of the contact hole CH can be kept small, and, at the same time, the thickness unevenness of the alignment film 41 can be suppressed. The contact holes (CH14 and CH17) are also provided in layers (the inorganic insulating film 14 and the interlayer insulating film 17) other than the organic insulating film 15 in order to connect the pixel electrode 18 and the drain electrode 13c to each other. Therefore, in order to suppress application unevenness of the alignment film material and suppress the thickness unevenness of the alignment film, it is conceivable to investigate the inflow of the alignment film material into the contact hole CH constituted of the contact holes CH14, CH15 and CH17 provided in the inorganic insulating film 14, the organic insulating film 15 and the interlayer insulating film 17. However, since the organic insulating film 15 has a larger thickness than other layers, other layers arranged on the organic insulating film 15 are provided so as to follow the surface shape of the organic insulating film 15. As a result, the surface shape of the thin-film transistor substrate 10 is the same as the surface shape of the organic insulating film 15. Therefore, the inflow of the alignment film material into the contact hole CH constituted of the contact holes provided in the respective layers is greatly influenced by the surface shape of the contact hole CH15 provided in the organic insulating film 15. Thus, in the present embodiment, the surface shape of the contact hole CH15 provided in the organic insulating film 15 is improved as described above, whereby the inflow of the alignment film material into the contact hole CH can be improved.

In JP 2015-87652 A, considering that a region where the alignment film is not properly formed is generated when the alignment film material flows into the contact hole, the application direction is defined so as to avoid the inflow of the alignment film material into the contact hole. On the other hand, in the present embodiment, designing is made so that the alignment film material actively flows into the contact hole CH15 to suppress application unevenness, and the technical idea is different from that of JP 2015-87652 A.

Hereinafter, the present embodiment will be described in more detail.

The insulating substrates 11 and 21 are base materials having insulating properties. Examples of the insulating substrate include substrates such as a glass substrate and a plastic substrate.

The gate insulating film 12 may be, for example, an inorganic film (relative dielectric constant $\varepsilon$=5 to 7) such as a silicon nitride (SiNx) film or a silicon oxide (SiO$_2$) film, or a multilayer film containing any of these films.

The source electrode 13b and the drain electrode 13c are formed using the same material as that of the source line 131. Examples of materials of these electrodes include a conductive layer containing a metal such as titanium, aluminum, molybdenum, copper, or chromium, or an alloy thereof. The film thickness of the drain electrode 13c is, for example, 1500 Å or more and 3500 Å or less. The drain electrode 13 is electrically connected to the pixel electrode 18c via the contact hole CH penetrating the inorganic insulating film 14, the organic insulating film 15 and the interlayer insulating film 17.

The inorganic insulating film 14 may be, for example, an inorganic film (relative dielectric constant $\varepsilon$=5 to 7) such as a silicon nitride (SiNx) film or a silicon oxide (SiO$_2$) film, or a multilayer film containing any of these films. The thickness of the inorganic insulating film 14 is, for example, 1500 Å or more and 3500 Å or less.

The pixel electrode 18 is disposed on the organic insulating film 15. Here, the disposition of the pixel electrode on the organic insulating film means that the pixel electrode is disposed on the upper side (liquid crystal layer side) of the organic insulating film. As in the present embodiment, the pixel electrode 18 may be disposed on the organic insulating film 15 through the common electrode 16 and the interlayer insulating film 17, or the interlayer insulating film 17 and the common electrode 16 are provided in the given order on the upper side (liquid crystal layer side) of the pixel electrode 18, and the pixel electrode 18 may be disposed immediately above the organic insulating film 15. In this case, a slit is provided in a region of the common electrode 16 corresponding to each of the pixel electrodes 18.

As the common electrode 16 and the pixel electrode 18, a conductive layer containing a transparent conductive material such as indium tin oxide (ITO), indium zinc oxide (IZO), zinc oxide (ZnO), or tin oxide (SnO), or an alloy thereof can be used. The film thickness of the common electrode 16 is, for example, 500 Å or more and 1500 Å or less. The film thickness of the pixel electrode 18 is, for example, 400 Å or more and 900 Å or less.

The interlayer insulating film 17 may be, for example, an inorganic film (relative dielectric constant $\varepsilon$=5 to 7) such as a silicon nitride (SiNx) film or a silicon oxide (SiO$_2$) film, or a multilayer film containing any of these films. The thickness of the interlayer insulating film 17 is, for example, 1500 Å or more and 3500 Å or less.

The alignment films 41 and 42 act to align liquid crystal molecules near the film in a specific direction to the film surface. The alignment films 41 and 42 preferably have been subjected to alignment treatment such as photo-alignment treatment or rubbing treatment. The alignment films 41 and 42 are films made of, for example, organic materials, and may be provided by applying an alignment film material containing a polymer on the thin-film transistor substrate 10 and the counter substrate 20. The thickness of each of the alignment films 41 and 42 is, for example, 500 Å or more and 1500 Å or less.

The organic insulating film 15 is disposed on the drain electrode 13c. Here, the disposition of the organic insulating film on the drain electrode means that the organic insulating film is disposed on the upper side (liquid crystal layer side) of the drain electrode. As in the present embodiment, the organic insulating film 15 may be disposed on the drain electrode 13c through the inorganic insulating film 14, or the organic insulating film 15 may be disposed immediately above the drain electrode 13c without providing the inorganic insulating film 14.

The organic insulating film 15 may be, for example, an inorganic film having a small relative dielectric constant (relative dielectric constant $\varepsilon$=3 to 4) such as a photosensitive acrylic resin film. The thickness of the organic insulating film 15 is not particularly limited but is, for example, 2

µm or more and 4 µm or less. Details of the shape of the contact hole CH15 provided in the organic insulating film 15 will be described below.

The bottom portion Ca of the contact hole CH15 provided in the organic insulating film 15 is a region surrounded by a lower portion (a portion far from the liquid crystal layer 30) of the side wall Cb out of an upper portion (a portion close to the liquid crystal layer 30) of the side wall Cb and the lower portion of the side wall Cb. A planar shape of the bottom portion Ca is not particularly limited, and it may be a circle as shown in FIG. 3, or an ellipse, a square, a rectangle, a rhombus, or the like. The contact hole CH15 provided in the organic insulating film 15 is constituted of a region surrounded by an opening surface (hereinafter also referred to as an upper base) Cc on the liquid crystal layer 30 side, an opening surface (hereinafter also referred to as a lower base) Cd opposite to the liquid crystal layer 30, and the side wall Cb. In the present specification, the upper portion of the side wall means a portion of the side wall located in a range from the upper base of the contact hole provided in the organic insulating film to D/3, where D is the depth of the contact hole provided in the organic insulating film. The lower portion of the side wall means a portion of a side wall located in a range from the lower base of the contact hole provided in the organic insulating film to D/3.

The depth D of the contact hole CH15 provided in the organic insulating film 15 is a distance between the upper base Cc and the lower base Cd of the contact hole CH15. The depth D is preferably 1 to 5 µm, more preferably 1.5 to 4 µm, and still more preferably 2 to 3 µm.

In a plan view, the first side wall portion Cb1 and the third side wall portion Cb3 are located at positions facing each other through the bottom portion Ca. The first side wall portion Cb1 and the third side wall portion Cb3 are located opposite to each other with the bottom portion Ca interposed therebetween. In FIG. 3, the first side wall portion Cb1 is disposed on the right side of the contact hole CH15, and the third side wall portion Cb3 is disposed on the left side of the contact hole CH15. The first straight line B1 may pass through a center portion of the bottom portion Ca.

In a plan view, the second side wall portion Cb2 and the fourth side wall portion Cb4 are located at positions facing each other through the bottom portion Ca. The second side wall portion Cb2 and the fourth side wall portion Cb4 are located opposite to each other with the bottom portion Ca interposed therebetween. In FIG. 3, the second side wall portion Cb2 is disposed on the lower side of the contact hole CH15, and the fourth side wall portion Cb4 is disposed on the upper side of the contact hole CH15. The second straight line B2 may pass through the center portion of the bottom portion Ca.

As described above, the first side wall portion Cb1, the third side wall portion Cb3, the second side wall portion Cb2 and the fourth side wall portion Cb4 are arranged respectively in four directions of right, left, lower, and upper with respect to the bottom portion Ca in a plan view. The contact hole CH15 provided in the organic insulating film 15 has a symmetrical shape in the left-right direction (a shape line-symmetrical with respect to the second straight line B2) in a plan view.

The inclination of the upper portion of the second side wall portion Cb2 is gentler than the inclination of the upper portion of the fourth side wall portion Cb4. Accordingly, since the size of the contact hole CH15 can be further reduced, a higher aperture ratio can be achieved.

When the inclination of the upper portion of the second side wall portion Cb2 is gentler than the inclination of the upper portion of each of the first side wall portion Cb1, the third side wall portion Cb3 and the fourth side wall portion Cb4, an inclination angle $\alpha 2$ of the upper portion of the second side wall portion Cb2 may be smaller than an inclination angle $\beta 1$ of the upper portion of the first side wall portion Cb1, an inclination angle $\beta 3$ of the upper portion of the third side wall portion Cb3, and the inclination angle $\beta 4$ of the upper portion of the fourth side wall portion Cb4.

In the present specification, the inclination angle of the upper portion of the side wall portion is an angle formed by a straight line, connecting an upper end of the side wall portion and a point of the side wall portion at the position of D/3 from the upper base Cc of the contact hole CH15 (hereinafter, this point is referred to as a D/3 point of the side wall portion), and a plane parallel to the insulating substrate 11. However, at this time, the straight line connecting the upper end of the side wall portion and the D/3 point of the side wall portion is set in such a direction that a distance between these two points becomes the shortest. The upper end of the side wall portion is an end of the side wall portion where a tangent line in contact with the upper portion of the side wall portion is parallel to the insulating substrate 11.

The inclination angles $\beta 1$, $\beta 3$ and $\beta 4$ may be substantially equal to each other, or at least one of the inclination angles may be different from the other inclination angles.

The inclination angle $\alpha 2$ is preferably 10° or more and 20° or less. By adopting such an embodiment, the surface tension at the upper portion of the second side wall portion Cb2 can be reduced, the alignment film material more easily flows into the contact hole CH15, and it is possible to further suppress application unevenness when the alignment film material is applied onto the thin-film transistor substrate 10 and to suppress the thickness unevenness of the alignment film 41. The inclination angle $\alpha 2$ is more preferably 12° or more and 18° or less.

The inclination angles $\beta 1$, $\beta 3$ and $\beta 4$ are preferably more than 20°. By adopting such an embodiment, the size of the contact hole CH15 can be further reduced. The inclination angles $\beta 1$, $\beta 3$ and $\beta 4$ are more preferably 70° or less, and still more preferably more than 20° and 45° or less.

The entire inclination from an upper end Cb21 to a lower end Cb22 of the second side wall portion Cb2 is gentler than the entire inclination from an upper end Cb11 to a lower end Cb12 of the first side wall portion Cb1, the entire inclination from an upper end Cb31 to a lower end Cb32 of the third side wall portion Cb3, and the entire inclination from an upper end Cb41 to a lower end Cb42 of the fourth side wall portion Cb4. In a plan view, a distance between the upper end Cb21 and the lower end Cb22 of the second side wall portion Cb2 is larger than a distance between the upper end Cb11 and the lower end Cb12 of the first side wall portion Cb1, a distance between the upper end Cb31 and the lower end Cb32 of the third side wall portion Cb3, and a distance between the upper end Cb41 and the lower end Cb42 of the fourth side wall portion Cb4.

The maximum distance W2 is preferably larger than the distance L and not more than twice the distance L. By adopting such an embodiment, the alignment film material passing through a position further away from the contact hole CH15 can be guided so as to enter into the contact hole CH15, whereby the thickness unevenness of the alignment film 41 can be further suppressed. The maximum distance W2 is more preferably larger than the distance L and not more than 1.5 times the distance L.

Although the distance L is not particularly limited as long as it is smaller than the maximum distance W2, the distance L is preferably 3 µm or more and 10 µm or less, and more preferably 4 µm or more and 7 µm or less.

Although the maximum distance W2 is not particularly limited as long as it is larger than the distance L, the maximum distance W2 is preferably larger than 3 µm and not more than 15 µm. By adopting such an embodiment, it is possible to prevent the contact holes CH15 provided in adjacent pixels from interfering with each other even when the definition becomes higher. The maximum distance W2 is more preferably 5 µm or more and 10 µm or less.

Figure 7:
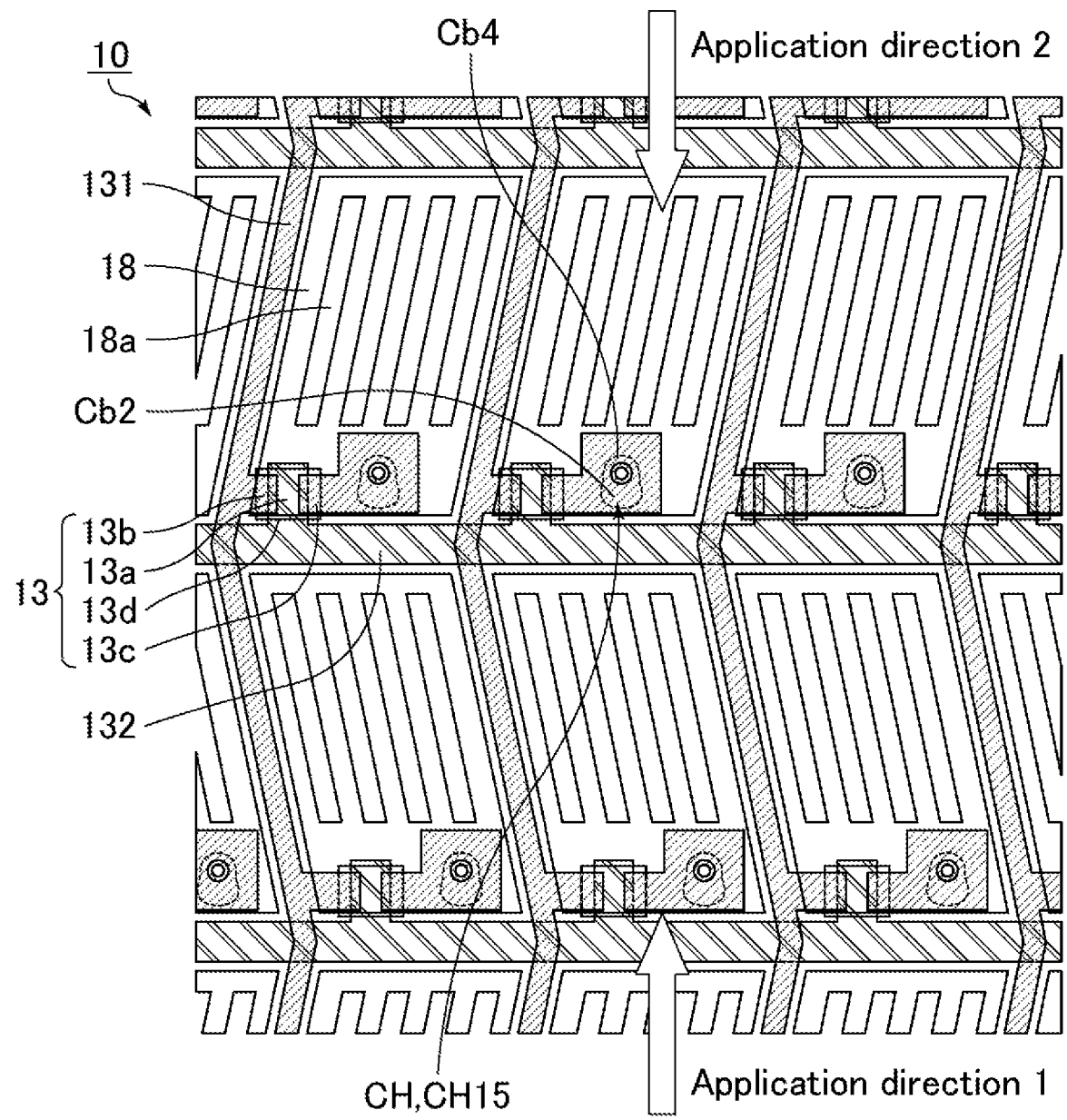
FIG. 7 is a schematic plan view illustrating a method of producing the thin-film transistor substrate included in the liquid crystal display device of Embodiment 1.

Hereinafter, an example of a method of producing the liquid crystal display device 1 of the present embodiment will be described. FIG. 7 is a schematic plan view illustrating a method of producing the thin-film transistor substrate included in the liquid crystal display device of Embodiment 1.

The thin-film transistor substrate 10 included in the liquid crystal display device of Embodiment 1 can be produced by the following method. First, the following steps are performed in order by a general method. The steps include a step (gate layer forming step) of forming the gate line 132 and the gate electrode 13a, a step (gate insulating film step) of forming the gate insulating film 12, a step (semiconductor layer forming step) of forming the thin-film semiconductor 13d, and a step (source layer forming step) of forming the source line 131, the source electrode 13b and the drain electrode 13c.

Then, an inorganic film such as a silicon oxide film or a silicon nitride film is formed by a CVD (Chemical Vapor Deposition) method or a sputtering method to form the inorganic insulating film 14.

In addition, a positive type photoresist is applied as an organic insulating film material onto the inorganic insulating film 14 by a spin coat method, for example, and exposure and development through a photomask are performed, whereby the photoresist is patterned to form the organic insulating film 15. Here, since the thickness of the organic insulating film 15 to be formed is determined by an exposure amount, a halftone region is provided in the photomask, and halftone exposure processing (processing of suppressing the exposure amount) is performed on the photoresist, so that a gentle slope can be provided to the side wall Cb of the contact hole CH15. More specifically, for example, a photomask provided with the following opening region, halftone region and light shielding region is used. The opening region is provided corresponding to a region where the bottom portion Ca of the contact hole CH15 is formed. The halftone region is provided corresponding to a region where the second side wall portion Cb2 of the contact hole CH15 is formed. The light shielding region is provided between the opening region and the halftone region. In addition, the halftone region makes a width in a direction parallel to the first straight line B1 larger than the opening region and makes a width in a direction parallel to the second straight line B2 narrower than the opening region. As a result, the second side wall portion Cb2 can be formed in a region corresponding to the halftone region, and the contact hole CH15 having the gentle second side wall portion Cb2 and the steep side wall portions Cb1, Cb3 and Cb4 can be formed.

In the direction parallel to the first straight line B1, the width of the halftone region is preferably larger than the width of the opening region and not more than twice the width of the opening region and more preferably 1.2 to 1.8 times the width of the opening region. In the direction parallel to the second straight line B2, the width of the halftone region is preferably 0.1 to 0.5 times and more preferably 0.15 to 0.3 times the width of the opening region.

For the side wall of the contact hole of the organic insulating film not subjected to halftone exposure, since the relative thickness of the organic insulating film abruptly changes from 100% to 0%, the inclination of the side wall becomes large. Thus, the surface tension increases at this portion, and it becomes difficult for the alignment film material to flow into the contact hole CH. On the other hand, for the side wall Cb (the second side wall portion Cb2) of the contact hole CH15 subjected to halftone exposure, since the relative thickness of the organic insulating film 15 gradually decreases in order of 100%, 50%, and 0%, for example, the inclination of the side wall Cb becomes small. Thus, the surface tension decreases at this portion, and the alignment film material easily flows into the contact hole CH. As described above, when a gentle gradient is provided to a portion of the side wall Cb of the contact hole CH15, the alignment film material easily flows into the contact hole CH, and it is possible to suppress a liquid pool of the alignment film material around the contact hole CH and to suppress application unevenness while uniformizing the thickness of the alignment film material around the contact hole CH. As a result, display unevenness can be improved.

Since a region where the photoresist is removed by exposure is narrower than a region to be exposed, considering this, it is desirable that a region where halftone exposure is performed is set larger than the maximum distance W2 of the second side wall portion Cb2.

In the present embodiment, the method of forming the organic insulating film 30 using the positive type photoresist has been described. However, since the film thickness can be controlled by the exposure amount also with a negative type photoresist, the organic insulating film 30 may be formed by applying an organic insulating film material which is a negative type photoresist and performing exposure and development. When the negative type photoresist is used, by using a photomask in which the opening region and the light shielding region in the photomask described in the positive type photoresist are inverted, the second side wall portion Cb2 can be formed in the region corresponding to the halftone region, and the contact hole CH15 having the gentle second side wall portion Cb2 and the steep side wall portions Cb1, Cb3 and Cb4 can be formed.

After the formation of the organic insulating film 15, a transparent conductive film is formed on an upper layer of the organic insulating film 15 by using the material of the common electrode 16 described above by a sputtering method, for example, and patterned into a desired shape to form the common electrode 16.

Next, an inorganic insulating film such as a silicon nitride film or a silicon oxide film is formed on an upper layer of the common electrode 16 by a CVD method, for example, and the interlayer insulating film 17 is formed. In addition, the inorganic insulating film 14 and the interlayer insulating film 17 are collectively patterned into a desired shape, and the contact holes CH14 and CH17 are formed in the inorganic insulating film 14 and the interlayer insulating film 17. In the present embodiment, although the inorganic insulating film 14 and the interlayer insulating film 17 are patterned at once, they may be patterned in separate processes.

Next, a transparent conductive film is formed on an upper layer of the interlayer insulating film 17 by using the material of the pixel electrode 18 described above by a sputtering method, for example, and patterned to form the pixel electrode 18 provided with the slit 18a. In this manner, the thin-film transistor substrate 10 can be produced.

After patterning the pixel electrode 18, the alignment film material is applied onto the thin-film transistor substrate 10 to form the alignment film 41. Examples of a method of applying the alignment film material include application methods such as an ink jet method and a roll coater method. When the alignment film material is added dropwise by the ink jet method, application unevenness is more likely to occur. However, according to the present embodiment, the alignment film material more easily flows into the contact hole CH15 from the second side wall portion Cb2 having at its upper portion a relatively gentle inclination and smaller surface tension, and it is possible to suppress application unevenness while suppressing a liquid pool of the alignment film material around the contact hole CH15. That is, according to the production method of the present embodiment, application unevenness can be effectively suppressed when the ink jet method is used in the applying the alignment film material, and the thickness unevenness of the alignment film 41 can be suppressed.

In the applying the alignment film material, it is preferable to sequentially add dropwise the alignment film material in a predetermined direction parallel to the second straight line B2. That is, in the applying the alignment film material, as shown in FIG. 7, it is preferable that the alignment film material is sequentially added dropwise in an application direction 1 from the second side wall portion Cb2 side toward the fourth side wall portion Cb4, or an application direction 2 from the fourth side wall portion Cb4 side toward the second side wall portion Cb2, and it is more preferable to sequentially add dropwise the alignment film material in the application direction 1.

When the alignment film material is added dropwise (applied) on the thin-film transistor substrate 10 by the ink jet method, a stage on which the thin-film transistor substrate 10 is mounted or an application head is not in a standstill state but moves continuously at a constant speed. Thus, the alignment film material applied from the application head has a vector spreading from an application start side (the side where dropping is started) to an application finish side (the side where dropping is finished). Therefore, when the alignment film material is sequentially added dropwise in the application direction 1 from the second side wall portion Cb2 side toward the fourth side wall portion Cb4 among the application directions shown in FIG. 7, the alignment film material discharged in front of the contact hole CH expands particularly in the direction of flowing into the second side wall portion Cb2 having a gentle slope. Therefore, the alignment film material more easily flows into the contact hole CH, and application unevenness can be further suppressed. According to such an embodiment, it is possible to obtain the effect of inflow into the contact hole CH to about the same extent as in Embodiment 2 (the thin-film transistor substrate 10 in which the inclination of the upper portion of the fourth side wall portion Cb4 is gentle in addition to the second side wall portion Cb2) to be described later, and the thickness unevenness of the alignment film 41 can be suppressed to about the same extent as in Embodiment 2.

Therefore, when the alignment film material is added dropwise in the application direction 1, while the size of the contact hole can be further reduced compared with Embodiment 2 to be described later, a higher aperture ratio can be realized, and, at the same time, the thickness unevenness of the alignment film 41 can be suppressed to about the same extent as in Embodiment 2. From the above, from the viewpoint of achieving a higher aperture ratio and suppressing application unevenness, the embodiment where the alignment film material is added dropwise in the application direction 1 of Embodiment 1 is a particularly preferable embodiment.

Therefore, when the alignment film material is sequentially added dropwise in the application direction 2 from the fourth side wall portion Cb4 side toward the second side wall portion Cb2 among the application directions shown in FIG. 7, the alignment film material added dropwise around the contact hole CH flows around the periphery of the contact hole CH to reach the second side wall portion Cb2 side and flows into the contact hole CH from the second side wall portion Cb2 side, and therefore, it is assumed that application unevenness can be suppressed. In this case, when the amount of the alignment film material to be added dropwise is increased, the effect of the flow of the alignment film material around the second side wall portion Cb2 is enhanced, so that it is possible to further suppress application unevenness and to suppress the thickness unevenness of the alignment film 41. Application unevenness can be further suppressed in the case of adding dropwise the alignment film material in the application direction 1, as compared with the case of adding dropwise the alignment film material in the application direction 2.

Next, a method of producing the counter substrate 20 will be described. The counter substrate 20 can be produced by using a general manufacturing technique. First, the black matrix 23 is formed on the insulating substrate 21, and is patterned by photolithography, for example, so as to have a desired matrix pattern.

Next, red, green and blue resist materials of the color filter 22 are sequentially formed by, for example, spin coating or slit coating, and patterned by photolithography, for example.

Next, an overcoat layer 24 formed from a transparent organic insulating film is formed on upper layers of the color filter 22 and the black matrix 23 by spin coating or slit coating, for example.

A transparent organic insulating film material is formed on an upper layer of the overcoat layer 24 by spin coating or slit coating, for example, and a photo spacer is patterned at a desired position. In this manner, a color filter substrate which is the counter substrate 20 can be produced.

Subsequently, an alignment film 42 can be formed by applying the alignment film material onto the counter substrate 20.

A sealing material is applied onto the thin-film transistor substrate 10 or the counter substrate 20 produced as described above, and the liquid crystal layer 30 is formed in a region surrounded by the sealing material. Then, the thin-film transistor substrate 10 and the counter substrate 20 are sealed with a sealing material, whereby the liquid crystal display device 1 of the present embodiment can be produced. The liquid crystal layer 30 may be formed in the region surrounded by the sealing material after sealing the thin-film transistor substrate 10 and the counter substrate 20 together. Specifically, there is a vacuum injection method in which an inlet is provided in a seal drawing pattern and a liquid crystal is injected in a vacuum chamber.

In the present embodiment, the FFS mode liquid crystal display device has been described as an example. However, the display mode of the liquid crystal display device is not particularly limited. Examples of display modes other than the FFS mode include an IPS (in-plane switching) mode in which liquid crystal molecules are oriented horizontal to the substrate surface and a horizontal electric field is applied to the liquid crystal layer, a TN (twisted nematic) mode in which liquid crystal molecules having a positive dielectric anisotropy are oriented in a 90° twisted state when seen from a direction normal to the substrate, and a VA (vertical alignment) mode in which liquid crystal molecules having a negative dielectric anisotropy are oriented perpendicular to the substrate surface.

Embodiment 2

Thus, in the present embodiment, features peculiar to this embodiment will be mainly described, and description overlapping with the above embodiment will be omitted. In Embodiment 1, the inclination of the upper portion of the second side wall portion is gentler than the inclination of the upper portion of each of the first side wall portion, the third side wall portion and the fourth side wall portion. However, in the present embodiment, the inclination of the upper portion of the second side wall portion is gentler than the inclination of the upper portion of each of the first side wall portion Cb1 and the third side wall portion Cb3, and, at the same time, the inclination of the upper portion of the fourth side wall portion is gentler than the inclination of the upper portion of each of the first side wall portion Cb1 and the third side wall portion Cb3. This case will be described below.

Figure 8:
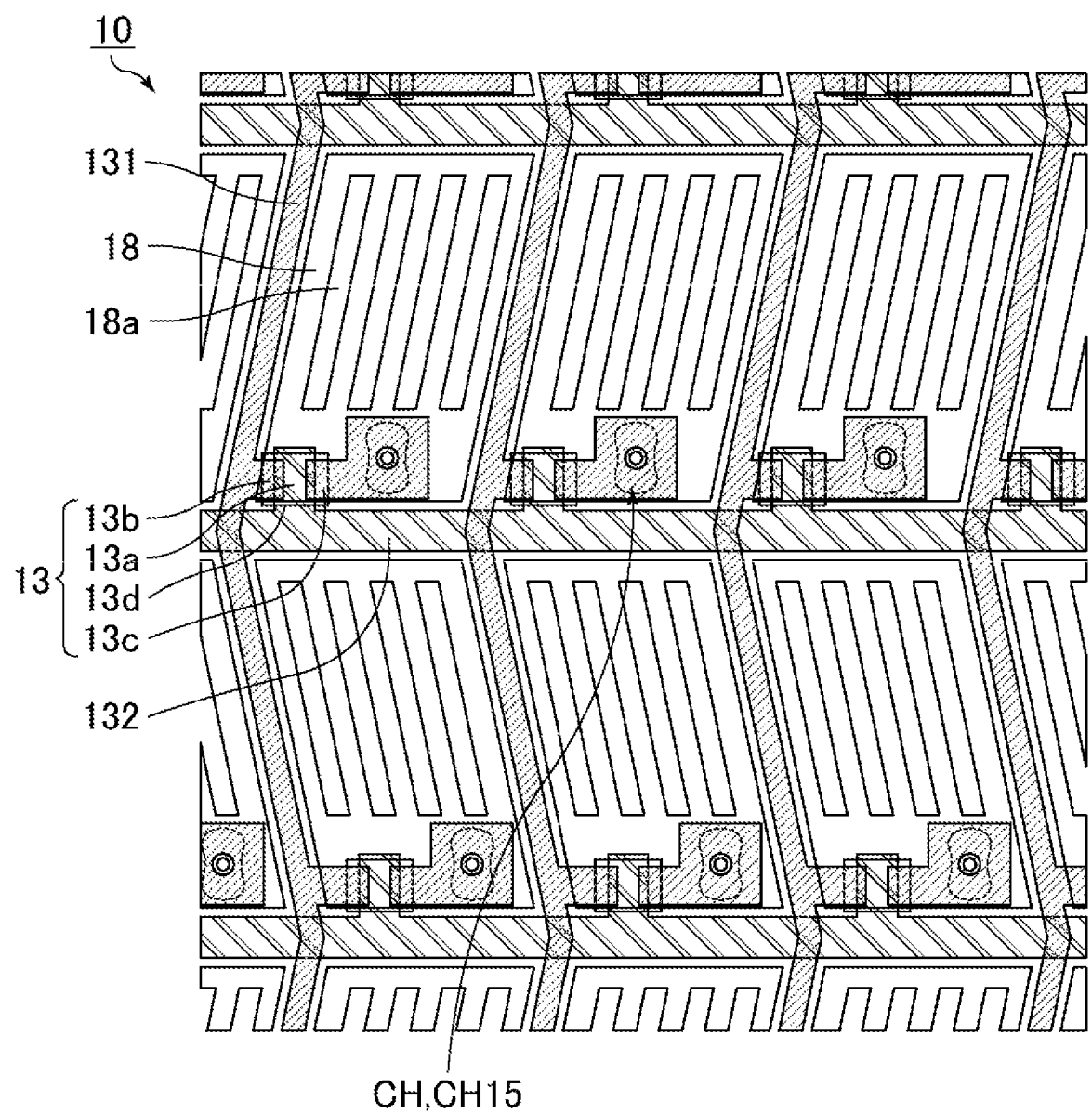
FIG. 8 is a schematic plan view of a thin-film transistor substrate included in a liquid crystal display device of Embodiment 2.

FIG. 8 is a schematic plan view of a thin-film transistor substrate included in the liquid crystal display device of Embodiment 2. A liquid crystal display device 1 of Embodiment 2 has the same configuration as the liquid crystal display device 1 of Embodiment 1 except that the shape of a contact hole CH15 provided in an organic insulating film 15 is different from that of Embodiment 1.

Figure 9:
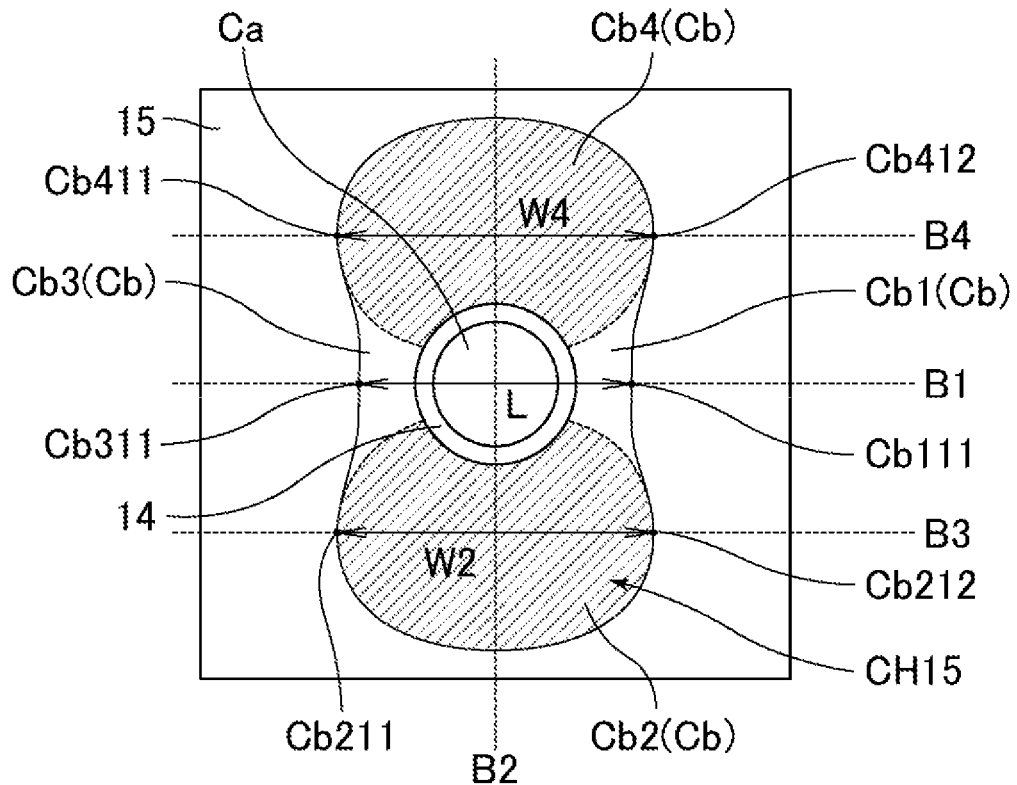
FIG. 9 is a schematic plan view of a contact hole portion provided in the thin-film transistor substrate included in the liquid crystal display device of Embodiment 2.
Figure 10:
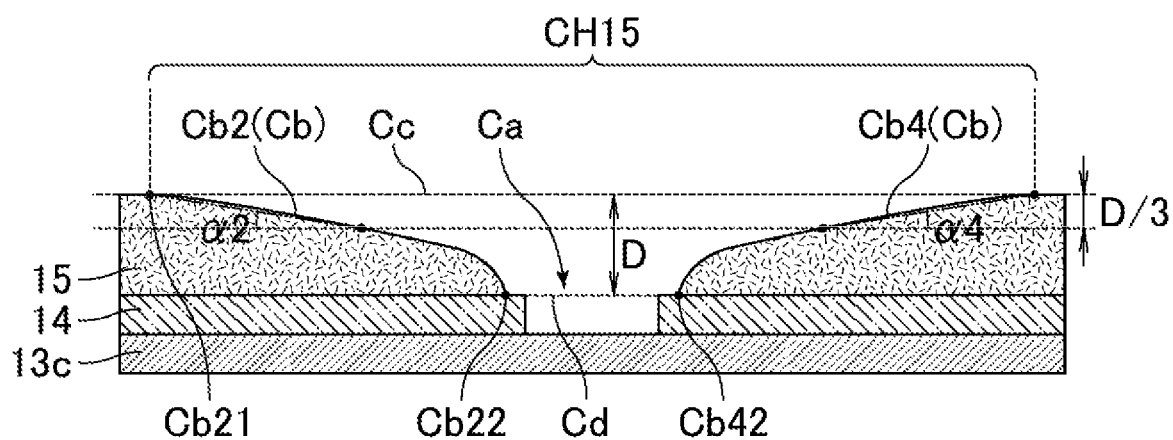
FIG. 10 is a schematic cross-sectional view of the contact hole portion provided in the thin-film transistor substrate included in the liquid crystal display device of Embodiment 2.
Figure 11:
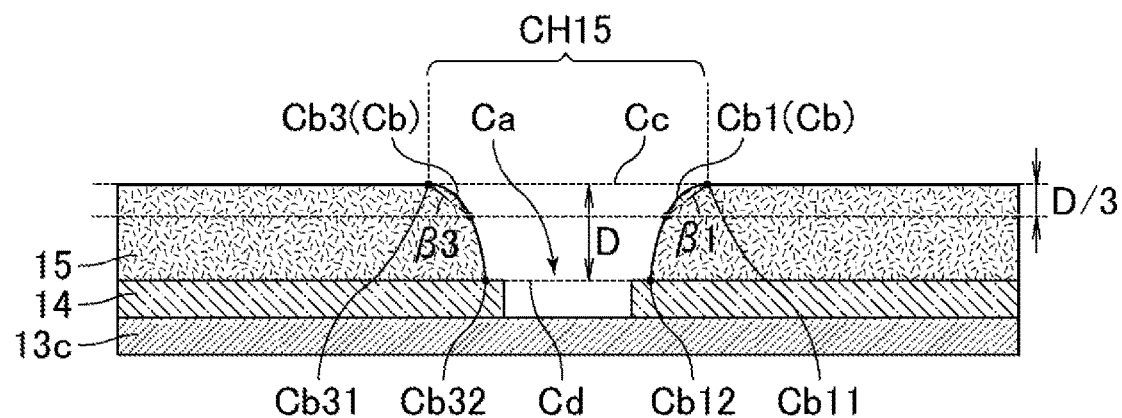
FIG. 11 is a schematic cross-sectional view of the contact hole portion provided in the thin-film transistor substrate included in the liquid crystal display device of Embodiment 2.

FIG. 9 is a schematic plan view of a contact hole portion provided in the thin-film transistor substrate included in the liquid crystal display device of Embodiment 2. FIGS. 10 and 11 are each a schematic cross-sectional view of the contact hole portion provided in the thin-film transistor substrate included in the liquid crystal display device of Embodiment 2. FIG. 10 is a schematic cross-sectional view taken along a second straight line B2 in FIG. 9. FIG. 11 is a schematic cross-sectional view taken along a first straight line B1 in FIG. 9. In FIGS. 10 and 11, the members provided above the organic insulating film 15 are omitted from the viewpoint of visibility.

An inclination of an upper portion of a second side wall portion Cb2 is gentler than the inclination of the upper portion of each of the first side wall portion Cb1 and the third side wall portion Cb3, and an inclination of an upper portion of a fourth side wall portion Cb4 is gentler than the inclination of the upper portion of each of the first side wall portion Cb1 and the third side wall portion Cb3. By adopting such an embodiment, when an alignment film material is applied onto a thin-film transistor substrate 10 of the present embodiment, the alignment film material easily flows into the contact hole CH15 from the second side wall portion Cb2 and the fourth side wall portion Cb4 each having at its upper portion a relatively gentle inclination and smaller surface tension, and it is possible to suppress application unevenness while suppressing a liquid pool of the alignment film material around the contact hole CH15 and to suppress the thickness unevenness of an alignment film 41. In the present embodiment, since there are two side wall portions (the second side wall portion Cb2 and the fourth side wall portion Cb4) having a relatively gentle inclination at its upper portion, the alignment film material more easily flows into the contact hole CH15 than Embodiment 1 in which there is one side wall portion (the second side wall portion Cb2) having a relatively gentle inclination at its upper portion, and film thickness unevenness can be suppressed more than in Embodiment 1.

In addition, by adopting the mode of the present embodiment, as compared with a case where an inclination of the entire side wall Cb surrounding a bottom portion Ca of the contact hole CH15 is gentle, the size of the contact hole CH15 can be further reduced. Therefore, even in a high definition liquid crystal display device, it is possible to suppress interference between contact holes of adjacent pixels and to form the contact hole CH15 as designed. Since it is difficult to control alignment of liquid crystal molecules at a portion where the contact hole CH15 is provided, the portion is shielded by the black matrix. However, in the present embodiment, since the size of the contact hole CH15 can be further reduced, a high aperture ratio can be achieved by reducing a light shielding region due to the black matrix. In the present embodiment, since there are two side wall portions (the second side wall portion Cb2 and the fourth side wall portion Cb4) having a relatively gentle inclination at its upper portion, the size of the contact hole CH15 is larger than that of Embodiment 1 in which there is one side wall portion (the second side wall portion Cb2) having a relatively gentle inclination at its upper portion. Thus, a higher aperture ratio can be achieved in Embodiment 1, as compared with the present embodiment.

When the inclination of the upper portion of the second side wall portion Cb2 is gentler than the inclination of the upper portion of each of the first side wall portion Cb1 and the third side wall portion Cb3, an inclination angle $\alpha 2$ of the upper portion of the second side wall portion Cb2 may be smaller than an inclination angle $\beta 1$ of the upper portion of the first side wall portion Cb1 and an inclination angle $\beta 3$ of the upper portion of the third side wall portion Cb3. When the inclination of the upper portion of the fourth side wall portion Cb4 is gentler than the inclination of the upper portion of each of the first side wall portion Cb1 and the third side wall portion Cb3, an inclination angle $\alpha 4$ of the upper portion of the fourth side wall portion Cb4 may be smaller than the inclination angle $\beta 1$ of the upper portion of the first side wall portion Cb1 and the inclination angle $\beta 3$ of the upper portion of the third side wall portion Cb3.

The inclination angles $\alpha 2$ and $\alpha 4$ may be substantially the same or different from each other. The inclination angles $\beta 1$ and $\beta 3$ may be substantially the same or different from each other. A preferable range of the inclination angle $\alpha 4$ is the same as the preferable range of the inclination angle $\alpha 1$.

The entire inclination from an upper end Cb21 to a lower end Cb22 of the second side wall portion Cb2 is gentler than the entire inclination from an upper end Cb11 to a lower end Cb12 of the first side wall portion Cb1 and the entire inclination from an upper end Cb31 to a lower end Cb32 of the third side wall portion Cb3. In a plan view, a distance between the upper end Cb21 and the lower end Cb22 of the second side wall portion Cb2 is larger than a distance between the upper end Cb11 and the lower end Cb12 of the first side wall portion Cb1 and a distance between the upper end Cb31 and the lower end Cb32 of the third side wall portion Cb3.

The entire inclination from an upper end Cb41 to a lower end Cb42 of the fourth side wall portion Cb4 is gentler than the entire inclination from the upper end Cb11 to the lower end Cb12 of the first side wall portion Cb1 and the entire inclination from the upper end Cb31 to the lower end Cb32 of the third side wall portion Cb3. In a plan view, a distance between the upper end Cb41 and the lower end Cb42 of the fourth side wall portion Cb4 is larger than the distance between the upper end Cb11 and the lower end Cb12 of the first side wall portion Cb1 and the distance between the upper end Cb31 and the lower end Cb32 of the third side wall portion Cb3.

Similarly to the second side wall portion Cb2, the contact hole CH15 provided in the organic insulating film 15 satisfies W4>L, wherein W4 is a maximum distance between one upper end Cb411 and the other upper end Cb412 of the fourth side wall portion Cb4 on a fourth straight line (imaginary line) B4 parallel to the first straight line B1. By adopting such an embodiment, when the alignment film material is applied onto the thin-film transistor substrate 10 to form the alignment film 41, an opening through which the alignment film material passes when flowing into the contact hole CH15 from the fourth side wall portion Cb4 can be increased compared with a case where W4≤L, and the alignment film material more easily flows into the contact hole CH15 from the fourth side wall portion Cb4. As a result, a liquid pool of the alignment film material around the contact hole CH15 can be suppressed, application unevenness can be suppressed when the alignment film 41 is formed on the thin-film transistor substrate 10 can be suppressed, and the thickness unevenness of the alignment film 41 can be suppressed.

The maximum distance W4 is preferably larger than the distance L and not more than twice the distance L. By adopting such an embodiment, the alignment film material passing through a position further away from the contact hole CH15 can be guided so as to enter into the contact hole CH15, whereby the thickness unevenness of the alignment film 41 can be further suppressed. The maximum distance W4 is more preferably larger than the distance L and not more than 1.5 times the distance L.

Although the maximum distance W4 is not particularly limited as long as it is larger than the distance L, the maximum distance W4 is preferably larger than 3 μm and not more than 15 μm. By adopting such an embodiment, it is possible to prevent the contact holes CH15 provided in adjacent pixels from interfering with each other even when the definition becomes higher. The maximum distance W4 is more preferably 5 μm or more and 10 μm or less.

Figure 12:
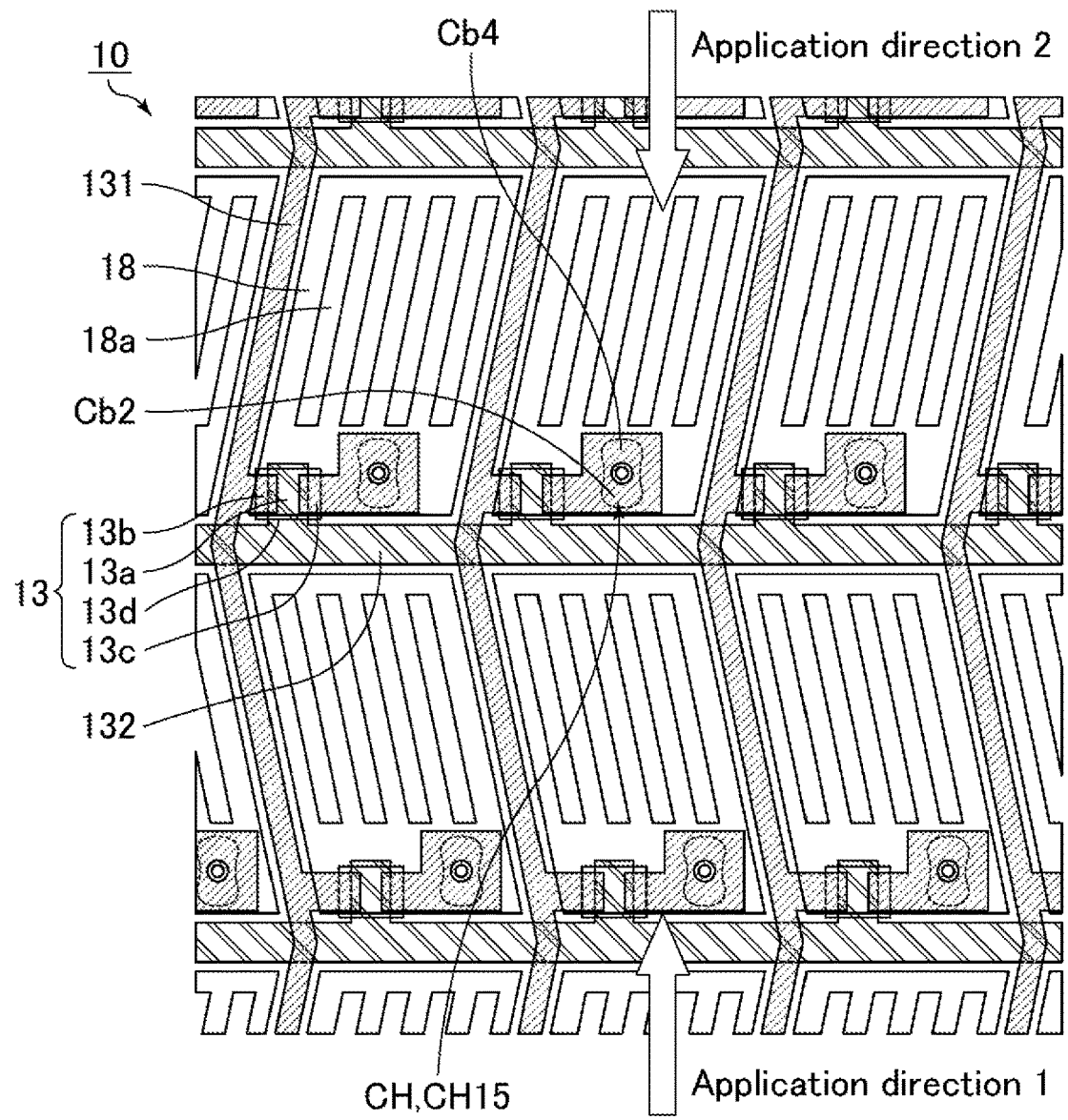
FIG. 12 is a schematic plan view illustrating a method of producing the thin-film transistor substrate included in the liquid crystal display device of Embodiment 2.

Hereinafter, an example of a method of producing the liquid crystal display device 1 of the present embodiment will be described. FIG. 12 is a schematic plan view illustrating a method of producing the thin-film transistor substrate included in the liquid crystal display device of Embodiment 2. The liquid crystal display device 1 of the present embodiment can be produced in the same manner as in the liquid crystal display device 1 of Embodiment 1.

In the method of producing the liquid crystal display device 1 of the present embodiment, for example, a photomask provided with the following opening region, halftone region and light shielding region is used. The opening region is provided corresponding to a region where the bottom portion Ca of the contact hole CH15 is formed. The halftone region is provided corresponding to regions where the second side wall portion Cb2 and the fourth side wall portion Cb4 of the contact hole CH15 are formed. The light shielding region is provided between the opening region and each of the halftone regions. In addition, each of the halftone regions makes a width in a direction parallel to the first straight line B1 larger than the opening region and makes a width in a direction parallel to the second straight line B2 narrower than the opening region. As a result, the second side wall portion Cb2 and the fourth side wall portion Cb4 can be formed in regions corresponding to the two halftone regions, and the contact hole CH15 having the gentle side wall portions Cb2 and Cb4 and the steep side wall portions Cb1 and Cb3 can be formed.

In the direction parallel to the first straight line B1, the width of each of the halftone regions is preferably larger than the width of the opening region and not more than twice the width of the opening region and more preferably 1.2 to 1.8 times the width of the opening region. In the direction parallel to the second straight line B2, the width of each of the halftone regions is preferably 0.1 to 0.5 times and more preferably 0.15 to 0.3 times the width of the opening region.

In the method of producing the liquid crystal display device 1 of the present embodiment, in the applying the alignment film material described above, it is preferable to sequentially add dropwise the alignment film material in a predetermined direction parallel to the second straight line B2. That is, as shown in FIG. 12, it is preferable that the alignment film material is sequentially added dropwise in an application direction 1 from the second side wall portion Cb2 side toward the fourth side wall portion Cb4, or an application direction 2 from the fourth side wall portion Cb4 side toward the second side wall portion Cb2. As a result, a liquid crystal material discharged in front of the contact hole CH expands particularly in the direction of flowing into the second side wall portion Cb2 or the fourth side wall portion Cb4 having a gentle slope. Therefore, the alignment film material more easily flows into the contact hole CH, and application unevenness can be further suppressed.

What is claimed is:
1. A liquid crystal display device comprising:
   a thin-film transistor substrate;
   a counter substrate facing the thin-film transistor substrate; and
   a liquid crystal layer held between the thin-film transistor substrate and the counter substrate,
   wherein the thin-film transistor substrate includes a thin-film transistor including a drain electrode, an organic insulating film disposed on the drain electrode, and a pixel electrode disposed on the organic insulating film,
   the pixel electrode is connected to the drain electrode through a contact hole provided in the organic insulating film,
   the contact hole provided in the organic insulating film includes a bottom portion and a side wall surrounding the bottom portion,
   the side wall includes a first side wall portion, a second side wall portion, a third side wall portion, and a fourth side wall portion in the given order in a circumferential direction of the contact hole,
   in a plan view, while the first side wall portion, the bottom portion, and the third side wall portion are arranged in the given order on a first straight line, the second side wall portion, the bottom portion, and the fourth side wall portion are arranged in the given order on a second straight line orthogonal to the first straight line,
   an inclination of an upper portion of the second side wall portion is gentler than an inclination of an upper portion of each of the first side wall portion and the third side wall portion, and
   the contact hole provided in the organic insulating film satisfies W2>L, wherein L is a distance from an upper end of the first side wall portion to an upper end of the third side wall portion on the first straight line, and W2 is a maximum distance between one upper end and another upper end of the second side wall portion on a third straight line parallel to the first straight line, wherein the inclination of the upper portion of the second side wall portion is gentler than an inclination of an upper portion of the fourth side wall portion.

2. The liquid crystal display device according to claim 1, wherein an inclination angle of the upper portion of each of the first side wall portion and the third side wall portion is more than 20°, and an inclination angle of the upper portion of the second side wall portion is 10° or more and 20° or less.

3. The liquid crystal display device according to claim 1, wherein an inclination angle of the upper portion of the fourth side wall portion is more than 20°.

4. The liquid crystal display device according to claim 1, wherein an inclination of an upper portion of the fourth side wall portion is gentler than the inclination of the upper portion of each of the first side wall portion and the third side wall portion, and the contact hole provided in the organic insulating film satisfies W4>L, wherein W4 is a maximum distance between one upper end and another upper end of the fourth side wall portion on a fourth straight line parallel to the first straight line.

5. The liquid crystal display device according to claim 4, wherein an inclination angle of the upper portion of the fourth side wall portion is 10° or more and 20° or less.

6. A method of producing a liquid crystal display device including a thin-film transistor substrate, a counter substrate facing the thin-film transistor substrate, and a liquid crystal layer held between the thin-film transistor substrate and the counter substrate, wherein the thin-film transistor substrate includes a thin-film transistor including a drain electrode, an organic insulating film disposed on the drain electrode, and a pixel electrode disposed on the organic insulating film, the pixel electrode is connected to the drain electrode through a contact hole provided in the organic insulating film, the contact hole provided in the organic insulating film includes a bottom portion and a side wall surrounding the bottom portion, the side wall includes a first side wall portion, a second side wall portion, a third side wall portion, and a fourth side wall portion in the given order in a circumferential direction of the contact hole, in a plan view, while the first side wall portion, the bottom portion, and the third side wall portion are arranged in the given order on a first straight line, the second side wall portion, the bottom portion, and the fourth side wall portion are arranged in the given order on a second straight line orthogonal to the first straight line, an inclination of an upper portion of the second side wall portion is gentler than an inclination of an upper portion of each of the first side wall portion and the third side wall portion, and the contact hole provided in the organic insulating film satisfies W2>L, wherein L is a distance from an upper end of the first side wall portion to an upper end of the third side wall portion on the first straight line, and W2 is a maximum distance between one upper end and another upper end of the second side wall portion on a third straight line parallel to the first straight line, the method comprising applying an alignment film material onto the thin-film transistor substrate, wherein the inclination of the upper portion of the second side wall portion is gentler than an inclination of an upper portion of the fourth side wall portion.

7. The method of producing a liquid crystal display device according to claim 6, wherein an inclination angle of the upper portion of each of the first side wall portion and the third side wall portion is more than 20°, and an inclination angle of the upper portion of the second side wall portion is 10° or more and 20° or less.

8. The method of producing a liquid crystal display device according to claim 6, wherein the applying an alignment film material includes adding dropwise the alignment film material onto the thin-film transistor substrate by an ink jet method.

9. The method of producing a liquid crystal display device according to claim 8, wherein the applying an alignment film material includes adding dropwise the alignment film material sequentially in a predetermined direction parallel to the second straight line.

10. The method of producing a liquid crystal display device according to claim 9, wherein the applying an alignment film material includes adding dropwise the alignment film material sequentially from a second side wall portion side toward a fourth side wall portion side.

11. The method of producing a liquid crystal display device according to claim 10, wherein an inclination angle of the upper portion of the fourth side wall portion is more than 20°.

12. The method of producing a liquid crystal display device according to claim 9, wherein the applying an alignment film material includes adding dropwise the alignment film material sequentially from a fourth side wall portion side toward a second side wall portion.

13. The method of producing a liquid crystal display device according to claim 12, wherein an inclination angle of the upper portion of the fourth side wall portion is more than 20°.

14. The method of producing a liquid crystal display device according to claim 9, wherein an inclination of an upper portion of the fourth side wall portion is gentler than the inclination of the upper portion of each of the first side wall portion and the third side wall portion, and the contact hole provided in the organic insulating film satisfies W4>L, wherein W4 is a maximum distance between one upper end and another upper end of the fourth side wall portion on a fourth straight line parallel to the first straight line.

15. The method of producing a liquid crystal display device according to claim 14, wherein an inclination angle of the upper portion of the fourth side wall portion is 10° or more and 20° or less.

* * * * *